Patented Sept. 2, 1924.

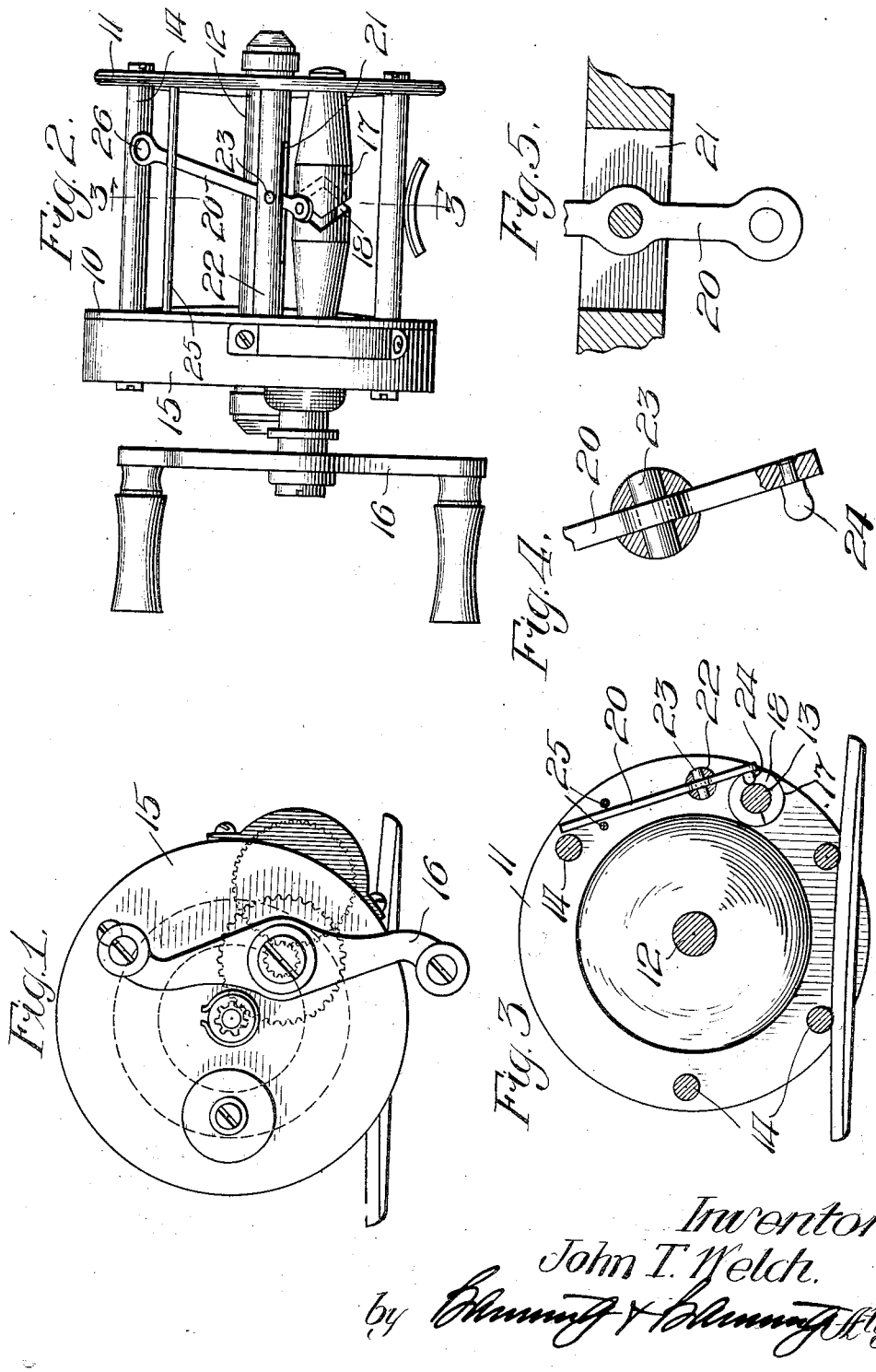

1,507,404

UNITED STATES PATENT OFFICE.

JOHN T. WELCH, OF DOWAGIAC, MICHIGAN, ASSIGNOR TO JAMES HEDDON'S SONS, OF DOWAGIAC, MICHIGAN, A CORPORATION OF MICHIGAN.

LINE-DISTRIBUTING DEVICE FOR REELS.

Application filed August 3, 1923. Serial No. 656,399.

*To all whom it may concern:*

Be it known that I, JOHN T. WELCH, a citizen of the United States, residing at Dowagiac, in the county of Cass and State of Michigan, have invented certain new and useful Improvements in a Line-Distributing Device for Reels, of which the following is a specification.

This invention relates to an improved line distributing device for reels, such, for instance, as fishing reels, the present construction being distinctly economical to manufacture, as well as simple, certain, and durable in operation. It makes use of a line distributing arm to which an oscillatory motion is imparted by a cam in such a manner that the line is caused to wind substantially level upon the reel. The various advantages to be derived from my invention will appear hereinafter from the specification and claims, and from the accompanying drawing wherein a fishing reel equipped with the present line distributing device is shown in the manner following:

Figure 1 is an end elevation thereof;

Fig. 2 is a side elevation thereof;

Fig. 3 is a transverse section therethrough on line 3—3 of Fig. 2;

Fig. 4 is an enlarged fragmentary detail of the oscillating arm showing in transverse section the mounting therefor; and Fig. 5 is a longitudinal section through the mounting for the oscillating arm, and shows also a portion of this latter element.

The principal parts of the fishing reel herein illustrated include a pair of spaced head plates 10 and 11 between which are spool and cam shafts 12 and 13, respectively, as well as the usual pillars 14. Associated with the head plate is a chamber 15 within which may be arranged a driving connection between the two shafts to which rotation is imparted through the medium of a crank 16.

In the middle region of its length the cam shaft is represented as having a cylindrical portion 17 wherein is formed a cam groove 18. This groove which extends spirally around the shaft is pitched first in one direction through a distance of 180°, and then in the opposite direction through a like distance. By preference, this groove is formed with an abrupt turn at its two opposite points of diverging pitch.

Associated with a cam shaft of this general description is an arm 20 disposed through a slot 21 that is longitudinally formed in a pillar 22 which extends fixedly between the head plates of the reel. The arm is mounted to oscillate in this pillar, and for this purpose a pin 23 extends transversely therethrough and through the arm which thereby becomes a lever of the first class. The slot 21 is so disposed transversely of the pillar as to maintain one end of the arm adjacent the cam shaft at which point it is provided with a head 24 adapted to track within the cam groove 18. If desired, a pair of guide bars 25 may be arranged adjacent opposite sides of the free end of the arm wherein is formed an eye 26, but the guiding function should in all ordinary conditions of use be satisfactorily performed by the walls of the slot 21.

In the operation of the reel, a relatively slow motion is imparted to the cam shaft as the spool shaft is revolved under the rotative force applied to the crank 16. With rotation of the cam shaft a longitudinal force is applied by the cam to the power end of the distributing arm, this force proceeding first in one direction for 180° of rotation, and then in the opposite direction through the balance of the cycle. The arm is thereby caused to sweep back and forth at a substantially constant speed. At the completion of each oscillatory movement, a pause which is but momentary will occur, with the result that the line which is threaded through the eye 25 will wind practically level upon the reel.

This invention possesses numerous advantages from the standpoint of manufacture, assembly and maintenance. The simplicity of the construction practically assures of no trouble in operation. The wearing parts of the cam device which are exposed to view may, for the same reason, be readily cleaned and oiled. Such friction as results from the use of this level wind device is negligible owing to the simplicity and small number of its operating parts.

It is to be noted that only a small space is available in a fishing reel for a distributing arm and cam operating mechanism of the kind described. For this, as well as other reasons, it is difficult to incorporate in the reel structure a mechanism consisting of only a few parts which will operate to sweep the distributing arm through the desired arc and with a substantially constant speed. The present construction, however, meets these requirements very satisfactorily, due in a large measure to the use of a first class lever for the distributing arm, its fulcrum being intermediate the power and weight points with the result that I obtain a maximum oscillation with the power force applied relatively close to the fulcrum and at a maximum distance from the weight.

I claim:

1. In combination with a fishing reel, line distributing means therefor comprising a shaft connected to rotate with the reel, a pillar fixedly extended adjacent the shaft, there being a slot formed transversely and longitudinally through the pillar, a lever extended through the slot and fulcrumed to the pillar to oscillate within the slot thereof, one end of the lever being thereby maintained adjacent to the shaft, means at the opposite lever end for guiding a line in its winding movements upon the reel, and a cam device associated with the shaft adapted to engage the end of the lever proximate thereto so as to oscillate the same, substantially as described.

2. In combination with a fishing reel, line distributing means therefor comprising a shaft connected to rotate with the reel, a cam associated with the shaft, a lever of the first class having a mounting on the reel and in engagement with the cam so as to be oscillated thereby, and means on the lever adapted to engage the line to move the same back and forth across the reel, substantially as described.

3. In combination with a fishing reel, line distributing means therefor comprising a shaft connected to rotate with the reel, a spiral groove pitched to extend first in one direction for 180° around the shaft and then through the remaining 180° in an opposite direction, an oscillatable arm having a mounting intermediate its ends adjacent to the shaft and provided at one end with means which tracks in the spiral groove thereof, and means adjacent the other arm and adapted to engage with a line to guide the same in its winding movements upon the reel, substantially as described.

4. In combination with a fishing reel, line distributing means therefor comprising a shaft connected to rotate with the reel, a lever of the first class having one end adjacent to the shaft, a cam device associated with the shaft and engaged with the lever in a manner to oscillate the same, and means adjacent the other end of the lever adapted to guide a line in its winding movements upon the reel, substantially as described.

5. In a fishing reel, the combination with a spool shaft, of a rotatable cam drivingly connected therewith, and a line distributing arm fulcrumed to oscillate about a center which is intermediate of its ends whereof one is engaged by the cam in a manner to oscillate the arm at a substantially constant speed throughout its arc of movement, the arm being adapted to guide a line in its windings upon the reel, substantially as described.

6. In a fishing reel, the combination with a spool shaft, a lever of the first class having means for guiding line windings upon the spool shaft, and a cam drivingly connected with the spool shaft and engaged with the lever in a manner to oscillate the latter at a substantially constant speed through its arc of movement, substantially as described.

7. In a fishing reel, the combination with a pair of spaced head plates, of a spool shaft and a cam shaft extending between the plates and provided with a common driving connection, the two shafts being mounted for rotative movement only, a lever of the first class having a fixed pivotal mounting relatively close to the cam shaft and a connection with the latter such that one end of the lever is oscillated through an arc substantially the distance between the two head plates, and means for confining the movements of the lever within a single plane, substantially as described.

JACK T. WELCH.

Witness:
EPHRIAM BANNING.